(12) United States Patent
Rote et al.

(10) Patent No.: US 7,628,601 B2
(45) Date of Patent: Dec. 8, 2009

(54) MACHINE FOR COMPRESSION MOLDING PLASTIC ARTICLES

(75) Inventors: B. Jack Rote, Sturgis, MI (US); David C. Thompson, Grabil, IN (US)

(73) Assignee: Rexam Closure Systems Inc., Perrysburg, OH (US)

( * ) Notice: Subject to any disclaimer, the term of this patent is extended or adjusted under 35 U.S.C. 154(b) by 155 days.

(21) Appl. No.: 11/881,970

(22) Filed: Jul. 30, 2007

(65) Prior Publication Data

US 2009/0035408 A1 Feb. 5, 2009

(51) Int. Cl.
*B29C 31/04* (2006.01)
(52) U.S. Cl. .................. 425/234; 425/297; 425/348 R; 425/809
(58) Field of Classification Search .................. 425/297, 425/305.1, 348 R, 809, 338, 344, 233–234
See application file for complete search history.

(56) References Cited

U.S. PATENT DOCUMENTS

| | | | |
|---|---|---|---|
| 2,138,923 A | 12/1938 | Johnson | |
| 4,035,128 A * | 7/1977 | Drostholm et al. | 425/259 |
| 5,807,592 A | 9/1998 | Alieri | |
| 6,123,880 A | 9/2000 | Ingram | |
| 6,368,094 B1 | 4/2002 | Dennis et al. | |
| 6,422,854 B1 | 7/2002 | Dennis et al. | |
| 6,478,568 B2 * | 11/2002 | Ingram | 425/297 |
| 6,585,508 B1 | 7/2003 | Zuffa | |
| 7,247,014 B2 | 7/2007 | Mattice et al. | |
| 2002/0121713 A1 | 9/2002 | Moss et al. | |
| 2003/0198707 A1 | 10/2003 | Battilani | |
| 2003/0198708 A1 | 10/2003 | Pucci | |
| 2004/0166193 A1 | 8/2004 | Parrinello et al. | |
| 2004/0208947 A1 | 10/2004 | Parrinello | |
| 2005/0031723 A1 | 2/2005 | Zoppas | |

FOREIGN PATENT DOCUMENTS

EP 1101587 A2 5/2001

* cited by examiner

*Primary Examiner*—Yogendra Gupta
*Assistant Examiner*—Thu Khanh T Nguyen
(74) *Attorney, Agent, or Firm*—Reising Ethington PC

(57) ABSTRACT

A machine for compression molding plastic articles includes a turret constructed for rotation around a vertical axis. A first array of compression molds and a second array of compression molds are mounted on the turret for movement through respective first and second mold paths as the turret rotates around the vertical turret axis. A first mold charge placement mechanism is disposed adjacent to the first path for placing mold charges into molds of the first array in sequence as the turret rotates. A second mold charge placement mechanism is disposed adjacent to the second path for placing mold charges into molds of the second array in sequence as the turret rotates and independently of the first mechanism. The first and second mold paths may be spaced from each other radially of the turret axis and/or longitudinally of the turret axis.

5 Claims, 4 Drawing Sheets

MACHINE FOR COMPRESSION MOLDING PLASTIC ARTICLES

The present disclosure relates to a machine for compression molding plastic articles, such as closure shells or sealing liners within closure shells.

BACKGROUND AND SUMMARY OF THE DISCLOSURE

Machines for compression molding closure shells, or compression molding sealing liners within closure shells, typically include a turret or carousel that rotates around a vertical axis. A plurality of molds are provided around the periphery of the turret in the form of male and female mold sections that are aligned along vertical axes parallel to the axis of turret rotation. Cams drive one or both of the mold sections of each pair between an open position, in which a molded part is stripped from the mold and a charge of molten plastic material is placed into the mold, and a closed position in which the mold sections are brought together to compression mold the shell or liner. In a liner machine, a premade closure shell is placed in a nest when the mold sections are open, and a charge or pellet of liner material is placed in the mold before the mold is closed. U.S. patents that illustrate machines of this type for compression molding plastic closure shells include U.S. Pat. Nos. 5,670,110, 5,989,007, 6,074,583 and 6,478,568. U.S. patents that illustrate machines of this type for compression molding sealing liners within closure shells include U.S. Pat. No. 5,451,360. U.S. Pat. No. 6,123,880 discloses a compression molding machine in which each mold has radially aligned mold cavities into which mold charges are placed by a single placement mechanism.

The present disclosure involves a number of aspects that can be implemented separately from or in combination with each other.

A machine for compression molding plastic articles in accordance with one aspect of the present disclosure includes a turret constructed for rotation around a vertical axis. A first array of compression molds and a second array of compression molds are mounted on the turret for movement through respective first and second mold paths as the turret rotates around the vertical turret axis. A first mold charge placement mechanism is disposed adjacent to the first path for placing mold charges into molds of the first array in sequence as the turret rotates. A second mold charge placement mechanism is disposed adjacent to the second path for placing mold charges into molds of the second array in sequence as the turret rotates and independently of the first mechanism. The first and second mold paths, which preferably are circular, may be spaced from each other radially of the turret axis and/or longitudinally of the turret axis.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
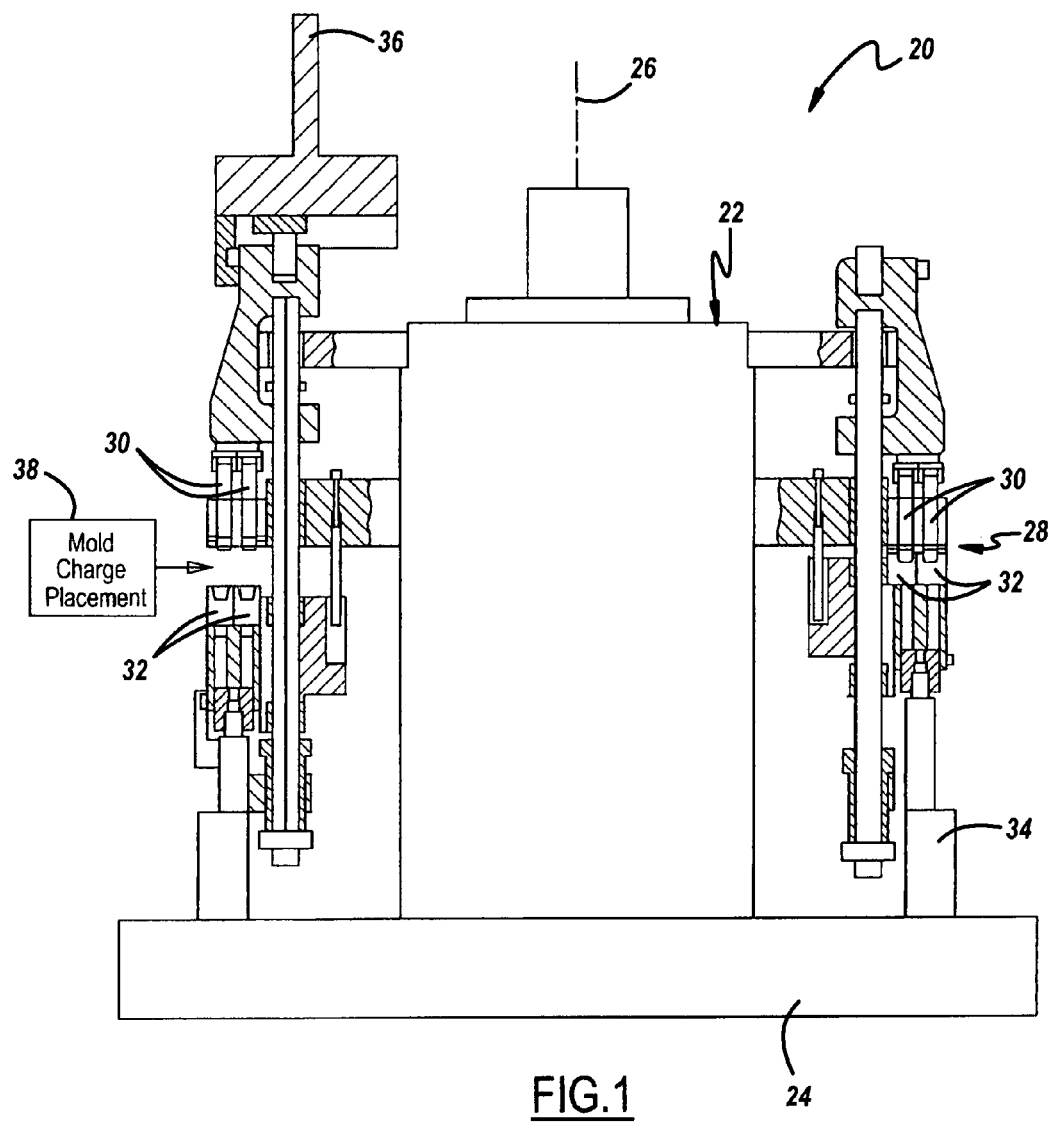
FIG. 1 is a partially sectioned elevational view of a compression molding machine in accordance with one exemplary embodiment of the present disclosure.
Figure 2:
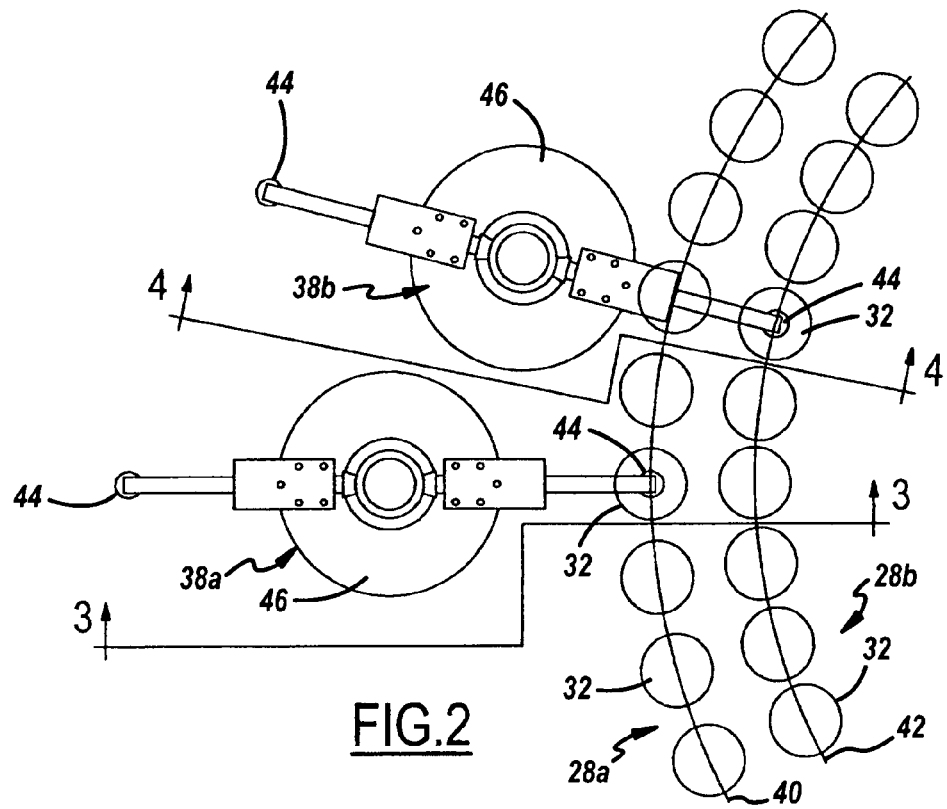
FIG. 2 is a schematic diagram that illustrates mold charge placement in the machine of FIG. 1.

The disclosure of U.S. application Ser. No. 11/156,115 is incorporated herein by reference.

FIGS. 1-4 illustrate a machine 20 for compression molding plastic articles in accordance with an exemplary embodiment of the present disclosure. Machine 20 includes a turret 22 mounted on a base 24 for rotation around a vertical axis 26. A plurality of compression molds 28 are disposed around the periphery of turret 22. Compression molds 28 include a first array 28a of compression molds mounted for movement with turret 22 in a first path 40 (FIG. 2) and a separate second array 28b of compression molds mounted for movement with turret 22 in a second path 42. Paths 40, 42 are circular paths in this embodiment, but could be closed non-circular paths. Each mold includes a male mold section 30 and a female mold section 32 aligned with each other along a vertical axis that is parallel to axis 26. One or both of the mold sections 30,32 can be driven between open and closed positions by cams 34,36 carried in stationary position relative to base 24, or by hydraulic or other suitable actuating means.

Figure 3:
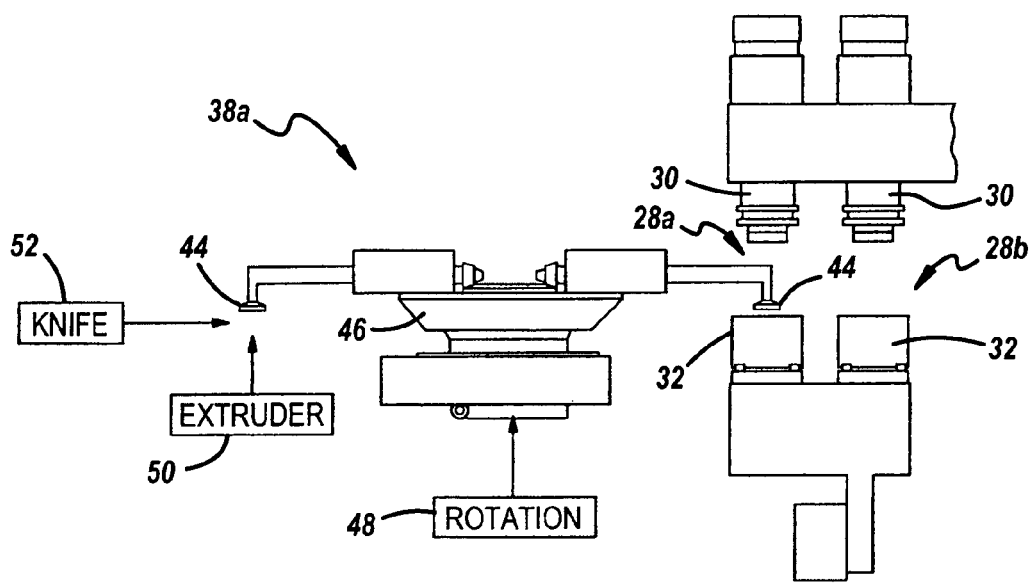
FIGS. 3 and 4 are schematic diagrams taken along the respective lines 3-3 and 4-4 in FIG. 2.
Figure 4:
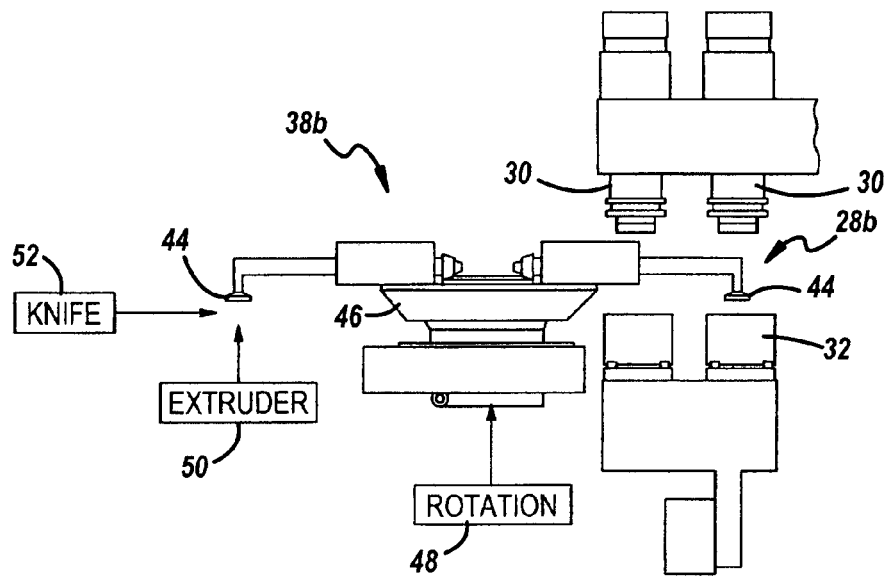

A mold charge placement mechanism 38 is disposed to place charges of molten plastics in each mold when mold sections 30,32 are open with respect to each other and as molds pass in sequence adjacent to mold charge placement mechanism 38. In the embodiment of FIGS. 1-4, mold paths 40,42 are spaced radially from each other with respect to turret axis 26, and preferably are such that the female mold sections 32 are in the same plane in the open position of the molds for receiving mold charges, as illustrated in FIGS. 3 and 4. A first mold charge placement mechanism 38a is disposed adjacent to first path 40 for placing mold charges into the molds of array 28a in sequence, and a second mold charge placement mechanism 38b is disposed adjacent to second path 42 for placing mold charges into the molds of array 28b path 42 in sequence. Each of the mold charge placement mechanisms 38a,38b operates independently of the other, and preferably are of the type disclosed in above-referenced U.S. application Ser. No. 11/156,115. However, other mold charge placement mechanisms can be employed.

Referring to FIG. 3, mold charge placement mechanism 38a preferably includes a pair of diametrically opposed pick-up cups 44 carried by a support 46. Support 46 is coupled to a suitable mechanism 48 for rotating the support around an axis that preferably is parallel to turret axis 26 (FIG. 1). An extruder 50 provides a stream of plastic extrudate, preferably a continuous stream, and a knife 52 severs the extrudate stream into individual mold charges that are transported by cups 44 from a position overlying extruder 50 to a position overlying female mold sections 32 of array 28a in sequence. Knife 52 is driven in synchronism with rotation of support 46, which in turn is driven in synchronism with rotation of turret 22 (FIG. 1). Mold charge placement mechanism 38b illustrated in FIG. 4 preferably is identical to mold charge placement mechanism 38a except that the pick-up cups 44 are disposed to place mold charges into the female mold sections 32 of mold array 28b in sequence.

Figure 5:
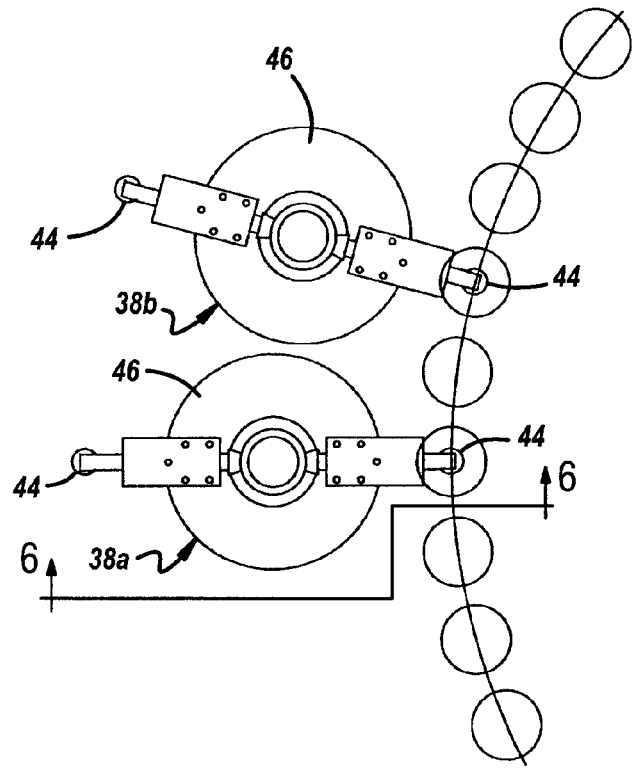
FIG. 5 is a schematic diagram of mold charge placement in accordance with a second exemplary embodiment of the disclosure.
Figure 6:
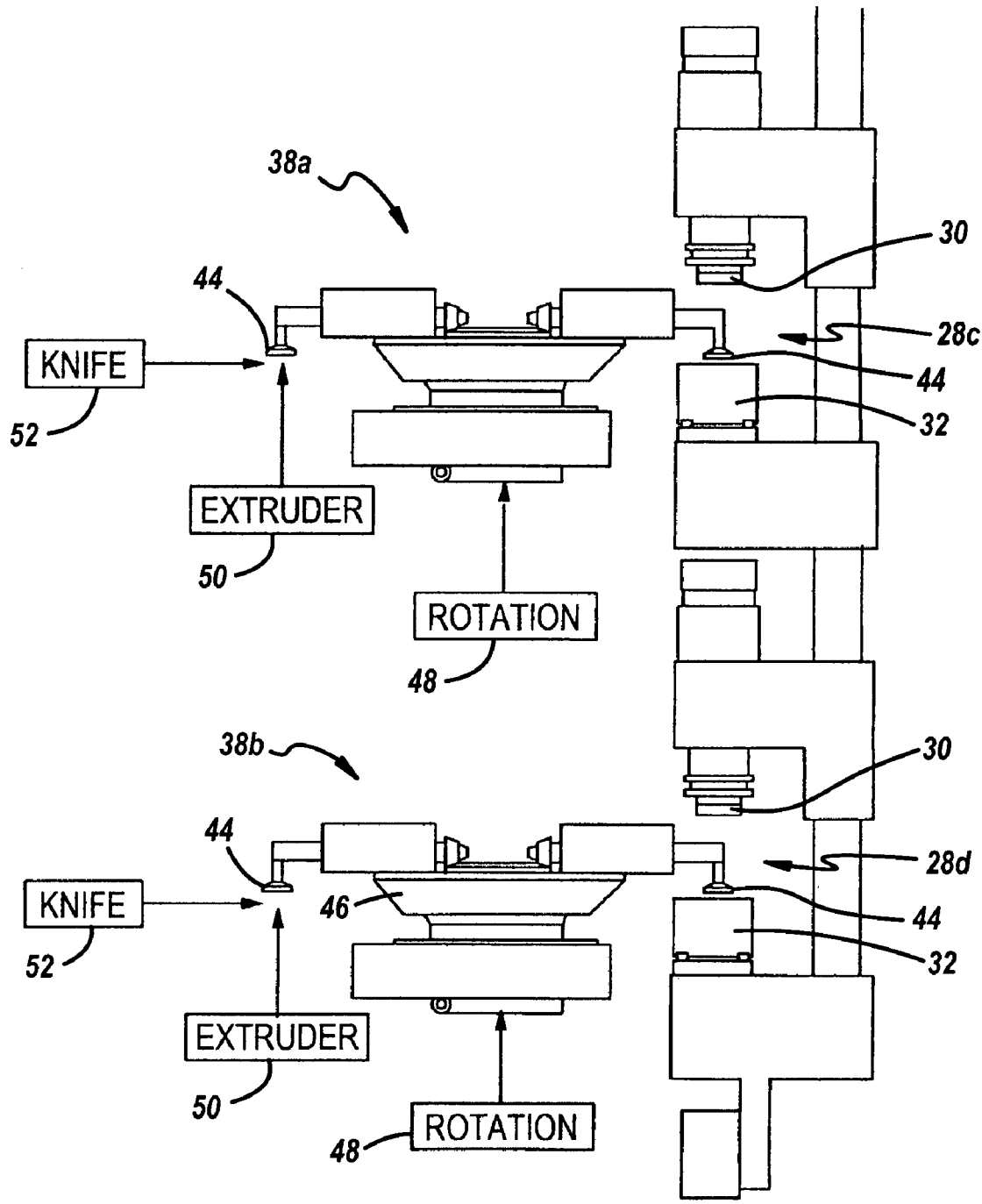
FIG. 6 is a fragmentary schematic diagram taken substantially along the line 6-6 in FIG. 5.

FIGS. 5 and 6 illustrate a second exemplary embodiment of the present disclosure, in which a first array 28c of compression molds and a second array 28d of compression molds are mounted on turret 22 (FIG. 1) for movement through respective paths that are spaced from each other in the direction of turret axis 26. These paths are illustrated in FIG. 5 as being aligned as viewed in the direction of the vertical turret axis, and in FIG. 6 as being vertically spaced. The mold paths could be radially as well as axially spaced. Mold charge placement mechanisms 38a,38b are disposed adjacent to the respective mold paths and operate independently of each other as in the embodiment of FIGS. 2-4.

The present disclosure thus has the advantage of effectively doubling production of molded plastic articles on a given turret, and the independently operable mold charge placement mechanisms have the advantage that one of the mechanisms may be shut down for maintenance or repair while the turret continues in production of molded plastic articles. The disclosure has been presented in conjunction with two exemplary embodiments, and a number of modifications and variations have been discussed. Other modifications and variations readily will suggest themselves to persons of ordinary skill in the art in view of the foregoing discussion. For example, the embodiments of FIGS. 2-4 and FIGS. 5-6 could be combined to provide a turret having both vertically spaced and radially spaced mold paths and four mold charge placement mechanisms that operate independently of each other. The disclosure is intended to embrace all such modifications and variations as fall within the spirit and broad scope of the appended claims.

The invention claimed is:

1. A machine for compression molding plastic articles, which includes:
   a turret constructed for rotation around a vertical axis,
   a first array of compression molds and a second array of compression molds mounted on said turret for movement through respective first and second mold paths around said vertical axis, wherein said first and second mold paths are spaced apart from each other at least one of radially or longitudinally of said vertical axis of said turret,
   a first mold charge placement mechanism disposed adjacent to said first path for placing mold charges into molds of said first array in sequence, and
   a second mold charge placement mechanism disposed adjacent to said second path for placing mold charges into molds of said second array in sequence and independently of said first mechanism.

2. The machine set forth in claim 1 wherein said first and second mold paths are spaced from each other radially of said vertical axis.

3. The machine set forth in claim 1 wherein said first and second mold paths are spaced from each other in the direction of said vertical axis.

4. The machine set forth in claim 1 wherein said first and second paths are circular.

5. The machine set forth in claim 1 wherein each of said mold charge placement mechanisms includes a knife for severing a stream of extrudate into individual mold charges, a pick-up for receiving the mold charges, and a support for moving said pick-up into position to release the mold charges into the molds in sequence.

* * * * *